US010615977B2

(12) United States Patent
Pandey et al.

(10) Patent No.: US 10,615,977 B2
(45) Date of Patent: Apr. 7, 2020

(54) VERIFICATION OF SECURE PARAMETERS FOR ROTATING CODES

(71) Applicant: NXP B.V., Eindhoven (NL)

(72) Inventors: Sujan Pandey, Waalre (NL); Piotr Polak, Eindhoven (NL)

(73) Assignee: NXP B.V., Eindhoven (NL)

( * ) Notice: Subject to any disclaimer, the term of this patent is extended or adjusted under 35 U.S.C. 154(b) by 106 days.

(21) Appl. No.: 15/783,018

(22) Filed: Oct. 13, 2017

(65) Prior Publication Data

US 2019/0116029 A1 Apr. 18, 2019

(51) Int. Cl.
| | | |
|---|---|---|
| *H04L 9/08* | (2006.01) | |
| *H04W 12/04* | (2009.01) | |
| *H04L 29/06* | (2006.01) | |
| *H04W 52/02* | (2009.01) | |

(52) U.S. Cl.
CPC .......... *H04L 9/0891* (2013.01); *H04L 9/0819* (2013.01); *H04L 9/0894* (2013.01); *H04L 63/068* (2013.01); *H04W 12/04* (2013.01); *H04W 52/0235* (2013.01)

(58) Field of Classification Search
CPC ... H04L 9/0891; H04L 69/321; H04L 67/327; H04L 9/0819; H04L 9/0894; H04L 63/068; H04W 4/005; H04W 52/0235; H04W 12/04
USPC .......................................... 380/286; 711/163
See application file for complete search history.

(56) References Cited

U.S. PATENT DOCUMENTS

| | | | | |
|---|---|---|---|---|
| 5,583,933 | A * | 12/1996 | Mark .................... | G06Q 20/341 |
| | | | | 235/380 |
| 7,853,691 | B2 | 12/2010 | Elzur et al. | |
| 7,987,367 | B2 * | 7/2011 | Yao ....................... | H04L 9/3026 |
| | | | | 380/28 |
| 8,948,387 | B2 | 2/2015 | Nica | |
| 9,124,580 | B1 | 9/2015 | Sampigethaya | |
| 9,130,771 | B2 * | 9/2015 | Millington .............. | H04L 67/02 |
| 9,330,561 | B2 * | 5/2016 | Proud .................... | A61B 5/486 |

(Continued)

OTHER PUBLICATIONS

Y. Xin, et al., Space-time constellation-rotating codes maximizing diversity and coding gains, Nov. 2001, GLOBECOM'01. IEEE Global Telecommunications Conference (Cat. No. 01CH37270), pp. 1-5.*

(Continued)

*Primary Examiner* — Lisa C Lewis
*Assistant Examiner* — Raied A Salman
(74) *Attorney, Agent, or Firm* — Rajeev Madnawat

(57) ABSTRACT

An example network communication device include a communication circuit and a processing circuit. The communication circuit securely communicates over a network using a rotating code and the processing circuit enter a sleep mode at which time values of the rotating code are unknown by the network communication device. The processing circuit enters the sleep mode by requesting another network communication device of the network to authorize entering the sleep mode, and entering the sleep mode responsive to an indication verifying that the network communication device and the other network communication device agree on a set of secure parameters that is created pseudo-randomly, wherein the processing circuit enters the sleep mode with the set of secure parameters as stored for awakening but without storage of the values of the rotating key.

20 Claims, 5 Drawing Sheets

(56) References Cited

U.S. PATENT DOCUMENTS

| | | | |
|---|---|---|---|
| 9,489,023 B1 | 11/2016 | Ispas | |
| 2007/0230393 A1* | 10/2007 | Sinha | H04W 52/0203 370/328 |
| 2007/0294496 A1* | 12/2007 | Goss | G06F 12/1408 711/163 |
| 2008/0102859 A1* | 5/2008 | Karr | G01S 13/825 455/456.3 |
| 2012/0054522 A1* | 3/2012 | Huang | H01M 10/48 713/323 |
| 2012/0159147 A1 | 6/2012 | Ando | |
| 2014/0282877 A1* | 9/2014 | Mahaffey | H04L 63/0853 726/3 |
| 2015/0156179 A1 | 6/2015 | Nica | |
| 2015/0172918 A1 | 6/2015 | Wu et al. | |
| 2017/0324646 A1 | 11/2017 | Johnsen et al. | |
| 2017/0339512 A1* | 11/2017 | Wang | H04W 4/70 |
| 2018/0013583 A1* | 1/2018 | Rubenstein | H04L 12/4633 |
| 2019/0116165 A1* | 4/2019 | Polak | H04L 63/1475 |
| 2019/0202447 A1* | 7/2019 | Taniguchi | G05D 1/0038 |

OTHER PUBLICATIONS

Stanley, D. Y. "Resolutions to CID 291 and Similar; comments", IEEE 802.11-09/0490r1, pp. 1-7 (May 2009).
L. Chen, "Recommendation for Key Derivation Using Pseudorandom Functions," NIST Special Publication 800-108 (Oct. 2009).
Non-Final Rejection for related U.S. Appl. No. 15/783,077, 26 pgs., (May 29, 2019).
Final Rejection for Patent Application No. 15/783,077, 30 pgs. (dated Dec. 12, 2019).

* cited by examiner

VERIFICATION OF SECURE PARAMETERS FOR ROTATING CODES

OVERVIEW

Aspects of various embodiments are directed to network communication devices that use a secure parameter protocol to verify a set of secure parameters used for encoding rotating codes.

Network communication devices can communicate securely using codes, such as keys, to code data communicated. To prevent or mitigate tampering with the code or identification of the code, the network communication device can use a rotating code (e.g. key) that changes values pseudo-randomly or randomly. The network communication device can communicate according to a protocol used. Some protocols may limit or not allow for different codes between different secure channels. The rotating code can be regularly rotated to prevent or mitigate tempering with the code by a malicious device.

As with many devices, the network communication devices may operate in different operation modes. For example, when not communicating, a particular network communication device may enter a sleep mode to reduce power consumption.

These and other matters have presented challenges to efficiencies of secure communications using rotating code implementations, for a variety of applications.

SUMMARY

Various example embodiments are directed to issues such as those addressed above and/or others which may become apparent from the following disclosure concerning securely communicating between network communication devices by using a secure parameter protocol which relies on and uses a set of secure parameters to encode a value of the rotating code prior to a network communication device entering a sleep mode.

In certain example embodiments, aspects of the present disclosure involve authorization of a network communication device entering a sleep mode, in which a current value of a rotating code is unknown. The authorization can include providing an indication verifying that the network communication device and another network communication device agree on a set of secure parameters used to encode (e.g., encrypt and decrypt) the value of the rotating code.

In more specific example embodiments, a network communication device includes a communication circuit and a processing circuit. The communication circuit can securely communicate within a wired communication network using a rotating code. For example, the communication circuit can securely communicate with another network communication device by a channel conveying data in the wired communication network and by using the rotating code for coding the data conveyed over the channel. The processing circuit can enter a sleep mode at which time values of the rotating code are unknown by the network communication device. While the network communication device is in the sleep mode, in various aspects, the other network communication device continues to rotate the value of the rotating code. The processing circuit enters the sleep mode by requesting the other network communication device authorizes entering the sleep mode and entering the sleep mode in response to a grant by the other network communication device. For example, the sleep mode is entered in response to an indication verifying that the network communication device and the other network communication device agree on a set of secure parameters that is created pseudo-randomly or randomly. The set of secure parameters are stored and used to code (e.g., encrypt and decrypt) the values of the rotating code, which are conveyed over the channel specific to the communication between the network communication device and the other network communication device. For example, responsive to the network communication device waking up from the sleep mode (e.g., transitioning to or entering an awake mode), the current value of the rotating code is encoded using the set of secure parameters and communicated over the channel. The set of secure parameters can include one or more Digital Signal Processor (DSP) channel parameters, e.g., channel coefficients computed by a DSP, and/or a previous or last value of the rotating code. The network communication device and other network communication device can communicate, including providing the indication, via a protocol used by each respective device. The processing circuit can enter the sleep mode with the stored set of secure parameters for awakening but without storage of the values of the rotating key.

In other specific example embodiments, a system includes a plurality of network communication devices that securely communicate data over one or more channels of a wired communication network (e.g., Ethernet network) using a rotating code. Each pair of network communication devices that communicate with one another can synchronize rotation of the rotating code. The plurality of network communication devices includes a first network communication device that can enter a sleep mode at which time a value of the rotating code (with respect to communicating with a second network communication device) is unknown to the first network communication device. The first network communication device enters the sleep mode by requesting authorization to enter the sleep mode to a second network communication device, and enters the sleep mode responsive to an indication verifying that the first network communication device and second network communication device agree on a set of secure parameters created pseudo-randomly (or randomly). The set of secure parameters is stored and used to code (e.g., encrypts and decrypts) the value of the rotating code. The first network communication device can enter the sleep mode with the stored set of secure parameters for awakening but without storage of the value of the rotating key.

In other specific example embodiments, a method includes securely communicating between a plurality of network communication devices of a wired communication network by one or more channels conveying data in the wired communication network and using a rotating code for coding the conveyed data. The method further includes entering, by a first network communication device of the plurality of network communication devices, a sleep mode at which time a value of the rotating code is unknown by the first network communication device. Entering the sleep mode can include a verification protocol that includes the first network communication device and a second network communication device of the plurality of network communication devices communicating a sleep mode request from the first network communication device to the second network communication device, a set of secure parameters that is created randomly or pseudo-randomly, and an indication verifying that the first network communication device and the second network communication device agree on the set of secure parameters. The set of secure parameters are stored and used encode, e.g., encrypt and decrypt, the value of the rotating code. The method further includes synchronizing the value of the rotating code between the first network communication device and second network communication device using the set of secure parameters responsive to the first network communication device transitioning from the sleep mode to an awake mode. For example, the first network communication device can enter the sleep mode with the stored set of secure parameters for transitioning to the awake mode but without storage of the value of the rotating key.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
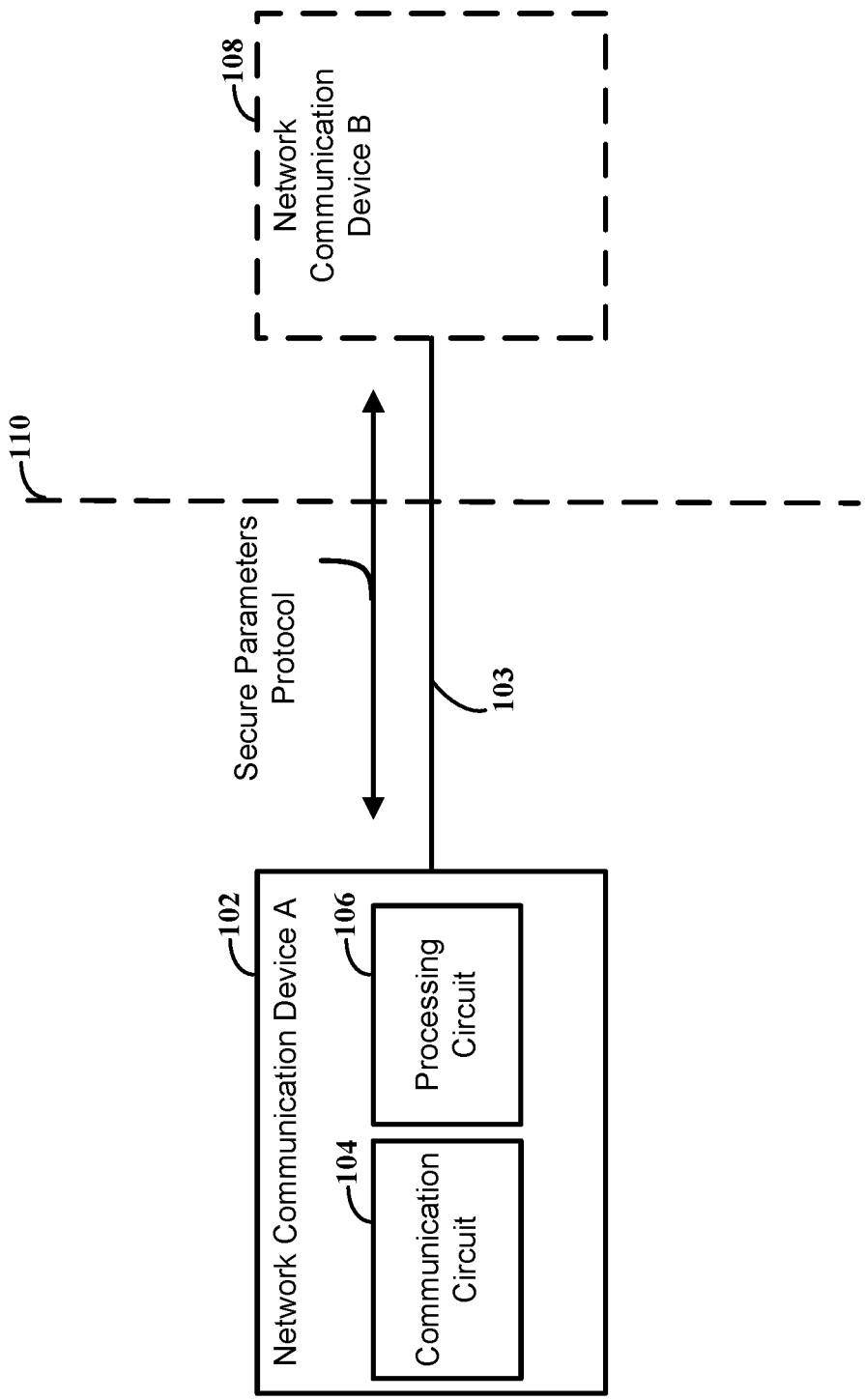
FIG. 1 is a device-level diagram illustrating an example network communication device, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving two or more network communication devices using a verification protocol which relies on and uses a set of secure parameters that is verified prior to one of the network communication devices entering a sleep mode.

In certain implementations, aspects of the present disclosure have been shown to be beneficial when used in the context of pseudo-randomly (or randomly) creating the set of secure parameters to send (e.g., encrypt and decrypt) values of a rotating code used for subsequently communicating within the wired communication network in an encoded/secure manner. In some embodiments, a network communication device waits for an indication verifying the set of secure parameters prior to entering the sleep mode in which the network communication device is unaware of a current value of the rotating code (e.g., a key). When the network device transitions from the sleep mode to an awake mode, the other network communication device provides the current value of the rotating code that is encoded using the set of secure parameters, thereby reducing or preventing a malicious device from learning or tampering with the current value of the rotating code. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments of the present disclosure are directed to techniques used to maintain secure communication between linked network communication devices of a wired communication network while at least one of the linked network communication devices is in a sleep mode and is unaware of a current value of a rotating code. Responsive to the network communication device awaking from the sleep mode, the network communication device is synchronized with the current value of the rotating code by the other network communication device providing the current value of the rotating code as encoded (e.g., encrypted) using a set of secure parameters. The encoded rotating code is conveyed over a channel specific to communications between the network communication device and the other network communication device. The set of secure parameters are stored by each of the network communication device and the other network communication device prior to the network communication device entering the sleep mode. For example, the network communication device enters the sleep mode after requesting authorization and receiving an indication verifying that the network communication device and the other network communication device agree on the set of secure parameters. The set of secure parameters can be pseudo-randomly or randomly created by the network communication device and/or the other network communication device. Example sets of secure parameters include one or more Digital Signal Processor (DSP) channel parameters and a last or previous value of the rotating code. Each device stores the agreed upon set of secure parameters and uses the set of secure parameters, as locally saved, to encrypt and/or decrypt the current value of the rotating code, which is used to synchronize the network communication device to the rotating code. In accordance with various embodiments, the synchronization technique can be used to maintain secure communication between network communication devices while also allowing for network communication devices to enter a sleep mode. As the synchronization occurs using a pseudo-random or random encoding (e.g., encryption), if a malicious device is physically tapped on the channel (e.g., a physical link), the malicious device is mitigated or prevented from tampering with the rotating code. Further, using the set of parameters, the malicious device can be detected.

In accordance with a number of embodiments, network communication devices of a wired communication network can communicate securely using codes to encode (e.g., encrypt and decrypt) data as conveyed over one or more channels specific to the network. The wired communication network can include a high speed wired network, such as Ethernet, although embodiments are not so limited. To prevent or mitigate tampering with the code (e.g., key) or identification of the code, the network communication device can use a rotating code that changes values pseudo-randomly or randomly. The network communication devices can communicate according to a protocol, defined by a standard specification, which is used by each of the network communication devices. Some standard specifications may limit or not allow for different codes/keys between different secure channels. The rotating code can be regularly rotated to prevent or mitigate tampering with the code by a malicious device.

The network communication devices may operate in different operation modes. For example, when not communicating, a particular network communication device may enter a sleep mode to reduce power consumption. When the particular network communication device is in a sleep mode, the rotating code used between the particular network communication device and another network communication device continues to rotate. The particular network communication device in the sleep mode becomes unsynchronized with the rotating code as the current value of the rotated code is unknown. As described above, to synchronize the network communication device with the rotating code responsive to transitioning from the sleep mode to an awake mode, the network communication device and the other network communication device use a set of secure parameters to encode and decode (e.g., encrypt and decrypt) a current value of the rotating code. For example, the current value of the rotating code, as encoded, is communicated to the network communication device over a channel specific to communication between the respective devices, and which synchronizes the network communication device with the rotating code. The set of secure parameters are pseudo-randomly or randomly created responsive to a sleep mode request by the network communication device and can prevent or otherwise mitigate a malicious device, that physically taps to the channel (e.g., a physical link), from tampering with and/or learning the rotating code.

In a number of embodiments, a verification protocol can be used by network communication devices for entering a sleep mode. For example, a network communication device can request authorization to enter a sleep mode. The sleep mode, as described above, can include a lower power consumption as compared to an awake mode and can also result in the network communication device not knowing a current value of a rotating code used for secure/coded communication with another network communication device. The network communication device, while in the sleep mode, can thus become unsynchronized with the rotating code. The network communication device includes a communication circuit that communicates securely over the network, e.g., with the other network communication device, using the rotating code. The network communication device also includes a processing circuit that is used to enter the sleep mode (in combination with the communication circuit) by requesting the other network communication device of the network to authorize entering the sleep mode, and entering the sleep mode responsive to an indication verifying that the network communication device and the other network communication device agree on a set of secure parameters that is created pseudo-randomly or randomly. The verifying indication can be associated with a protocol used by each of the devices, as further described herein.

The set of secure parameters can be used to code data conveyed, including encrypting and decrypting the values of the rotating code responsive to the network node transitioning from the sleep mode to an awake mode. For example, both the network communication device and the other network communication device locally store the set of secure parameters on a data storage circuit of the respective devices. The processing circuit of the network communication device can transition from the sleep mode to an awake mode in response to receiving a wake-up request from the other network communication device. The network communication device, during the transition, can provide a code synchronization request to the other network communication device. In response, the other network communication device provides a current value of the rotating code as encoded using the set of secure parameters to the network communication device over the channel that is specific to communications by the network communication device and the other network communication device. The network communication device can decode the current value of the rotating code using the set of secure parameters as locally stored.

In various embodiments, the set of secure parameters includes DSP channel parameters. For example, responsive to the sleep mode request from the network communication device, the other network communication device can request the set of secure parameters from the network communication device. In response to the request, the network communication device obtains the DSP channel parameters and communicates the DSP channel parameters to the other network communication device as the set of secure parameters. The network communication device can also locally store the DSP channel parameters. The DSP channel parameters can be obtained by a DSP associated with the network communication device computing the DSP channel parameters and providing the computed DSP channel parameters to the processing circuit. The other network communication device then provides an indication verifying that the network communication device and the other network communication device agree on the set of secure parameters to grant the sleep mode request. Alternatively and/or in addition, both the network communication device and the other network communication device can periodically and in a synchronized manner, obtain DSP channel parameters associated with the channel. As an example, DSP(s) associated with the channel can be located on each end of the channel and can periodically sample the DSP channel parameters.

In other embodiments and/or in addition, the set of secure parameters includes a previous value of the rotating code, such as the last value at the time of the sleep mode request by the network communication device. For example, responsive to the sleep mode request from the network communication device, the other network communication device can send a previous value of the rotating code to the communication device, and can locally store the same. In response to receiving the previous value of the rotating code, the network communication device stores the previous value locally as the set of secure parameters and communicates acknowledgement to the other network communication device of the agreement on the set of secure parameters. The other network communication device then provides an indication verifying that the network communication device and the other network communication device agree on the set of secure parameters to grant the sleep mode request. Alternatively and/or in addition, the network communication device and other network communication device can periodically store, and in a synchronized manner, a current value of rotating code as the set of secure parameters.

A number of embodiments are directed to a system that includes a plurality of network communication devices that securely communicate with one another by one or more channels conveying data in a wired communication network and using rotating codes for encoding the conveyed data. Each pair of network communication devices that communicate with one another can synchronize rotation of a respective rotating code. For example, the plurality of network communication devices include a first network communication device that can enter a sleep mode at which time the first network communication device becomes unsynchronized with the rotating code. The first network communication device enters the sleep mode by requesting authorization to enter the sleep mode to a second network communication device, and entering the sleep mode responsive to an indication verifying that the first network communication device and the second network communication device agree on a set of secure parameters created pseudo-randomly or randomly, the set of secure parameters being stored and used to code (e.g., encrypts and decrypts) the value of the rotating code. The first network communication device can enter the sleep mode with the stored set of secure parameters for awakening but without storage of the value of the rotating key.

In other specific example embodiments, a method includes a plurality of network communication devices securely communicating with one another by one or more channels conveying data in a wired communication network and using rotating codes for encoding the conveyed data. The method further includes entering, by a first network communication device of the plurality of network communication devices, a sleep mode at which time a value of the rotating code is unknown by the first network communication device. Entering the sleep mode can include the first network communication device and a second network communication device of the plurality of network communication devices communicating by a channel specific to communication between the first and the second network communications devices conveying data indicative of: a sleep mode request from the first network communication device to the second network communication device, a set of secure parameters that is created randomly or pseudo-randomly, and an indication verifying that the first network communication device and the second network communication device agree on the set of secure parameters, the set of secure parameters being stored and used to code the value of the rotating code. The method further includes synchronizing the value of the rotating code between the first network communication device and second network communication device using the set of secure parameters responsive to the first network communication device transitioning from the sleep mode to an awake mode. For example, the first network communication device can enter the sleep mode with the stored set of secure parameters for transitioning to the awake mode but without storage of the value of the rotating key.

Turning now to the figures, FIG. 1 is a device-level diagram illustrating an example network communication device, in accordance with the present disclosure. Although FIG. 1 is a device-level diagram, the network communication device 102 can be part of a wired communication network formed of a plurality of network devices that securely communicated via wired communications by one or more channels conveying data in the wired communication network, such as a high speed wired network. For example, to the right of the dashed-line 110 of FIG. 1, illustrates another network communication device 108 (which is herein referred to as "device B 108" for ease of reference). Communications between network communication devices can occur via secured communications. Data transferred over the wired communication network can be authenticated and coded (e.g., encrypted) using a protocol, which can be defined by a standard specification. A standard specification can describe a set of protocols which may be supported by a governing body, such as the Institute of Electrical and Electronic Engineers (IEEE). For example, a particular devices can implement a protocol and comply with a standard specification. In various embodiments, the secure (and wired) communication can occur via a stored code used to encode/encrypt a data frame. Some communication protocols, like those defined according to IEEE 802.1AE, may not allow for selections of different codes (e.g., keys) for different secure channels. In such instances, the code can be a rotating code (e.g., rotating key) in which the value is rotated at periodic times and/or otherwise regulated. Example wired communication networks include an Ethernet network, such as an automotive Ethernet network, digital subscriber line (DSL) networks, fiber optic networks, broadband over powerline (BPL), among other types of networks that provide wired communications.

The network communication devices can be in a variety of different modes including an awake mode, a sleep mode, and another sleep mode. The different modes can include different states and/or functionalities, such as different functional abilities and associated power consumptions. For example, when a network communication device is not communicating and/or otherwise being used, the network communication device can enter a sleep mode that has a lower power consumption than an awake mode. An awake mode includes or refers to a mode in which the network communication device is active. A sleep mode includes or refers to a mode in which the external voltage regulator is off and the network communication device is not aware of the current value of the rotating code. The network communication device can also be in another sleep mode in which the network communication device is periodically refreshed through refresh signals. The other sleep mode includes or refers to a mode in which the network communication device is awoken periodically through refresh signals and the DSP channel parameters are regularly updated, such as in accordance with IEEE-Energy Efficient Ethernet (EEE) 802.3. During the other sleep mode, the network communication device may be synchronized with (e.g., aware of) the current value of the rotating code due to the periodic refresh. By comparison, during the sleep mode, the network communication device is unaware of the current value of the rotating code and can be become unsynchronized with the rotating codes. The rotated codes used to encode data conveyed over a channel specific to the two network communication devices can continue to rotate when one of the network communication devices is in a sleep mode.

The network communication device 102, herein referred to as "device A 102" for ease of reference, includes a communication circuit 104 and a processing circuit 106. The communication circuit 104 can securely communicate over a network using a rotating code. The secure communication between device A 102 and device B 108 can be over a channel 103 that is specific to communications between device A 102 and device B and associated with the wired communication network. As described above, the rotating code can be regularly rotated and used for coding data conveyed over the channel 103 of the network, including encrypting and decrypting data. The beginning value of the rotating code can be a master code (e.g., master key) that each network communication device of the wired communication network is provided. Device A 102 can enter a sleep mode at which time values of the rotating code are unknown by device A 102 until proceeding through a wake-up process, by first verifying a set of secure parameters with device B. A secure parameters protocol, which relies on and uses the set of secure parameters, which are pseudo-randomly or randomly created, can be used to verify the set of secure parameters and to encode (e.g., encrypt) a current value of the rotating code. Device A 102 (e.g., via the processing circuit 106) enters the sleep mode with the stored set of secure parameters for awakening but without storage of the values of the rotating key (e.g., as rotating while device A 102 is in the sleep mode).

The encoded current value is provided to device A 102 in response to device A 102 waking up. For example, device B 108 can encrypt the current value of the rotating code, which is conveyed over the channel 103 that is specific to communications between device A 102 and device B 108. Device A 102 can then decode (e.g., decrypt) the current value of the rotating code using the set of secure parameters. In this manner, when device A 102 wakes up after entering the sleep mode, device A 102 is synchronized (by device B 108) to the current value of the rotating code in a way that a malicious device is prevented or mitigated from learning or tampering with the rotating code. A malicious device can, for example, be physically tapped on the channel 103 and listening to data frames communicated, and may be prevented and/or mitigated from tampering with the rotating code due to the pseudo-random or random encoding.

The processing circuit 106 (and optionally the communication circuit 104) can be used to enter the sleep mode via the secure parameters protocol which includes authorization of entering the sleep mode responsive to verification of the set of secure parameters. As described above, when device A 102 enters or is otherwise in the sleep mode, the values of the rotating code are unknown by device A 102. The processing circuit 106 can enter the sleep mode by requesting another network communication device, e.g., device B 108, of the network to authorize entering the sleep mode. In response to the request, an indication can be provided verifying that the device A 102 and device B agree on a set of secure parameters that is created pseudo-randomly or randomly. The set of secure parameters, which are stored by both device A 102 and device B 108, are used to encode and decode values of the rotating code. The verifying indication can be associated with a protocol used by each of the network communication device, e.g., device A 102 and device B 108, such as an acknowledgement (ACK) message. The protocol(s) can be defined by a standard specification, such as IEEE 802.1AE or other standards.

As a specific example, in response to the request to enter the sleep mode, device B 108 can send a message requesting that device A 102 provide an indication of the set of secure parameters. In some embodiments, the message request can include a request for DSP channel parameters. In other embodiments, the message request can include a previous value of the rotating code and request for verification of the same. A previous value of a rotating code includes or refers to a synchronized value of the rotating code used by the devices for secure communications, which can include the last value (e.g., is current at the time of the request to enter the sleep mode) or older values. The processing circuit 106 and the communication circuit 104 of device A 102 can, in response to the request, send a message indicative of the set of parameters to device B 108. The message indicative of the set of parameters can include the DSP channel parameters and/or an indication verifying storage of the set of parameters (e.g., the DSP channel parameters or the previous value of the rotating code). In response to the message indicative of the set of parameters, device B 108 grants the request by device A 102 to enter the sleep mode. For example, the grant includes the indication verifying that device A 102 and device B 108 agree on the set of secure parameters, such as an ACK message that grants the sleep request. In response to the grant, device A 102 enters the sleep mode with the stored set of secure parameters for awakening but without storage of the values of the rotating key as rotating while device A 102 is in the sleep mode.

In various related embodiments, device A 102 can include a data storage circuit. The data storage circuit is used to store the set of secure parameters, such as the DSP channel parameters (e.g., channel coefficients computed by a DSP of the device A 102) and/or a previous or last value of the rotating code. By storing the set of secure parameters, device A 102 can use the set of secure parameters to subsequently decode (e.g., decrypt) a current value of the rotating code that is encoded (e.g., encrypted, such as by device B 108) using the stored set of secure parameters. As a specific example, the processing circuit 106 of device A 102 can transition to or enter an awake mode after entering a sleep mode in response to receiving a wake-up request via the communication circuit 104. The wake-up request, which may be communicated to device A 102 by device B 108, can include a current value of the rotating code that is encoded using the set of secure parameters (which can be rotating while device A 102 is in the sleep mode). Alternatively and/or in addition, in response to receiving the wake-up request from device B 108 and/or transitioning to (e.g., going through training) the awake mode, device A 102 can send a request for code (e.g., key) synchronization to device B 108. Device B 108, in response to the code synchronization request, encodes a current value of the rotating code using the set of secure parameters (e.g., the DSP channel parameters and/or last code used as agreed upon) and communicates the encoded current value of the rotating code to device A 102. The wake-up request and code synchronization request include or refer to signals associated with a protocol used by both device A 102 and device B 108. Device A 102 uses the set of secure parameters, as stored, to decode the current value of the rotating code, and which is used to subsequently encoded, e.g., encrypt and decrypt, data for secure communication. Using the set of secure parameters, which are agreed upon prior to device A 102 entering the sleep mode, can mitigate or prevent a connected communication device that physically connects to the channel 103 from detecting and/or learning the current value of the rotating code. The connected communication device is not part of the network and may be malicious.

In a number of specific embodiments, the above-described technique can be used to detect a connected communication device, e.g., a malicious device. For example, current DSP channel parameters of the network communication device, e.g., device A 102, can be compared to the stored set of secure parameters. As previously described, the stored set of secure parameters can include DSP channel parameters. By comparing the stored DSP channel parameters to the current DSP channel parameters, the network communication device (or the other network communication device, e.g., device A 102 or device B 108) can identify another device is connected to the channel 103. As would be appreciated by one of ordinary skill, connection of a communication device to a channel can result in changes in the DSP channel parameters.

Figure 2:
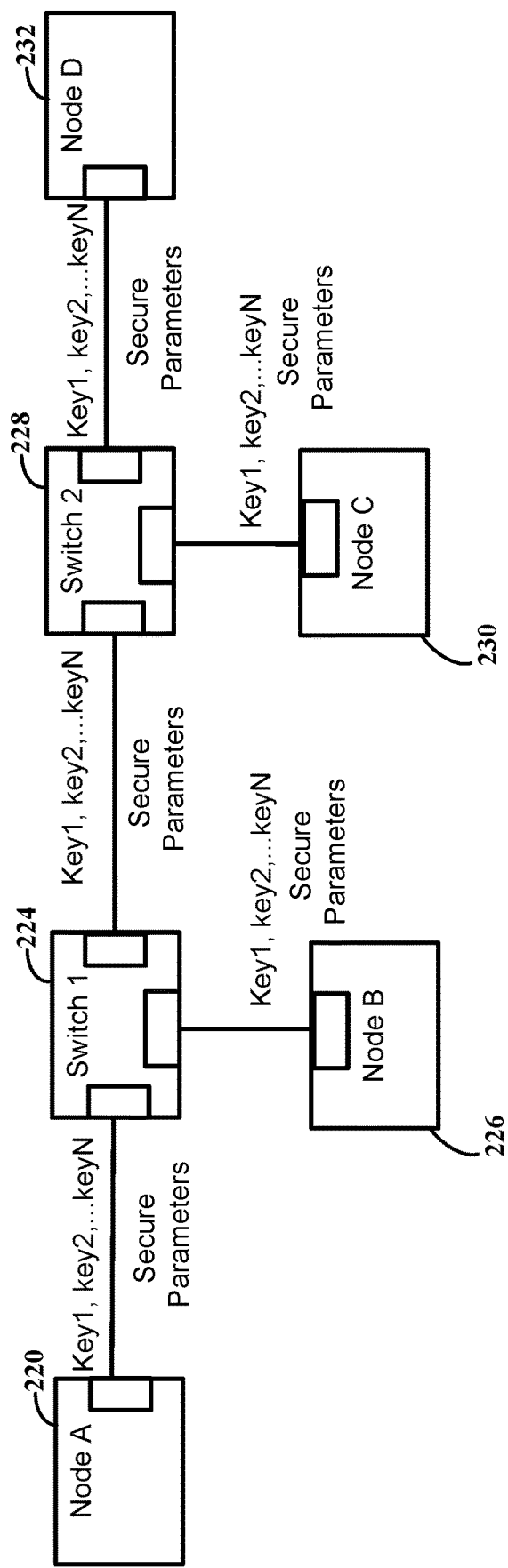
FIG. 2 is a system-level diagram illustrating an example of a plurality of network communication devices, in accordance with the present disclosure.

FIG. 2 is a system-level diagram illustrating an example of a plurality of network communication devices, in accordance with the present disclosure. As illustrated, the network can include a plurality of network communication devices 220, 224, 226, 228, 230, 232 that securely communicate with one another by one or more channels conveying data in the wired communication network. The network can include a wired communication network, such as an Ethernet network, that uses rotating codes to communicate between pairs of network communication device. Each pair of network communication devices that communicate to one another are connected via a respective channel, such that each channel is specific to communications between the two network communication devices. The network communication devices can include end nodes and switches. Network communication devices can securely communicate via a respective secure channel by coding data conveyed over the secure channel using a rotating code. As described above, when one of the network communication devices of a pair enters a sleep mode, the other network communication device of the pair continues to rotate the current value of the rotating code. When the network communication device transitions from the sleep mode, the network communication device synchronizes its rotating code value via requests and/or messages to the other network communication device conveyed as data over the respective secure channel, at least one of which is encoded via a set of secure parameters agreed upon prior to entering the sleep mode.

Figure 3:
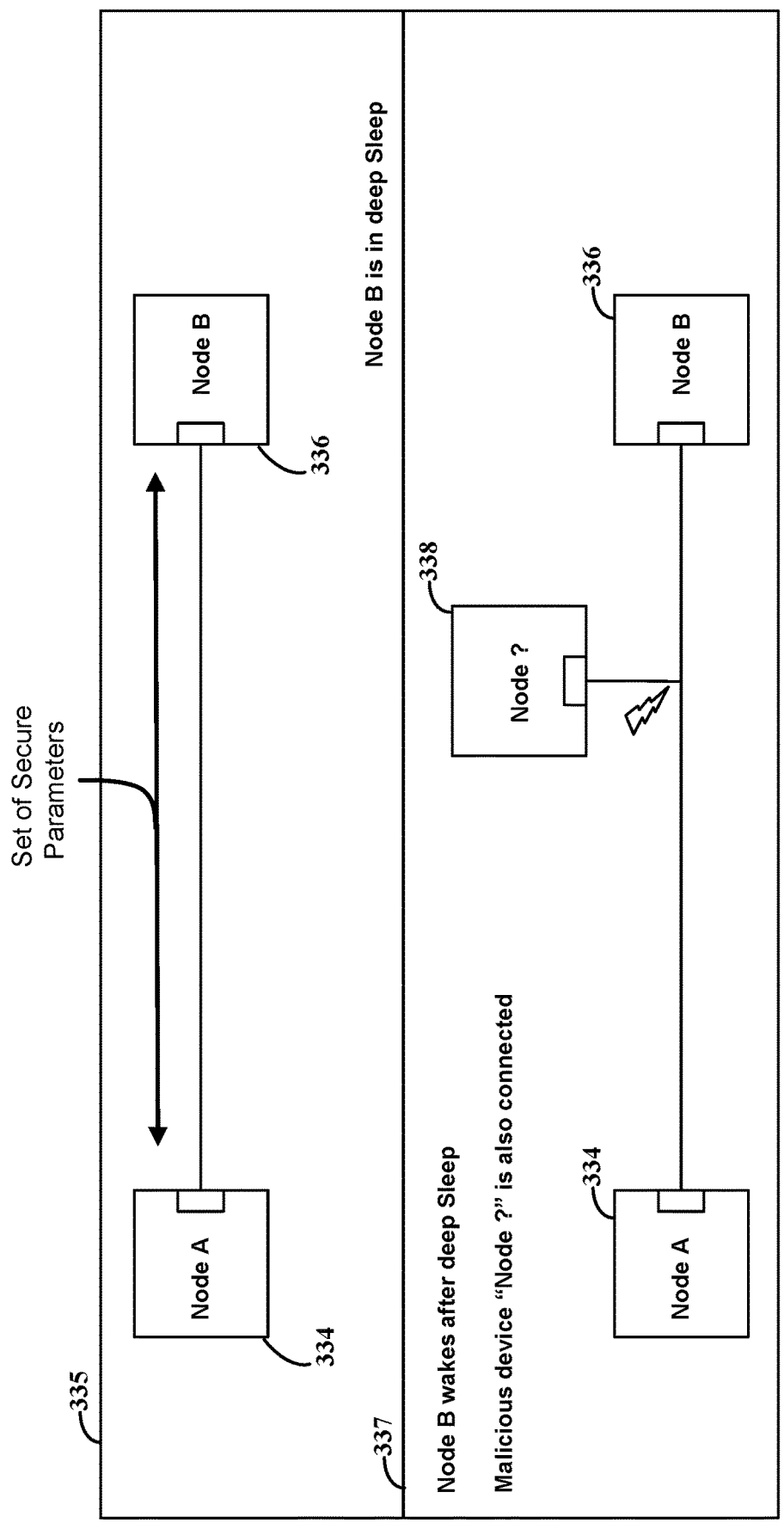
FIG. 3 is a system-level diagram illustrating a first network communication device and a second network communication device providing indications verifying agreement on a set of secure parameters, in accordance with the present disclosure.

FIG. 3 is a system-level diagram illustrating a first network communication device and a second network communication device providing indications verifying agreement on a set of secure parameters, in accordance with the present disclosure. The first and second network communication devices 334, 336 can be part of the system illustrated by FIG. 2. That is, the network can include a plurality of network communication devices. A first network communication device 336 (e.g., node B) can enter a sleep mode by requesting authorization to enter the sleep mode to a second network communication device 334 (e.g., node A), as illustrated by the top portion 335 of FIG. 3. As previously described, the first network communication device 336 enters the sleep mode responsive to an indication verifying that the first network communication device 336 and second network communication device 334 agree on a set of secure parameters created pseudo-randomly or randomly. The set of secure parameters can be stored by both the first and second network communication devices 334, 336 and used to encode and decode (e.g., encrypt and decrypt) the value of the rotating code.

In specific embodiments, the second network communication device 334 (e.g., node A) provides the indication verifying that the first and second network communication devices 334, 336 agree on the set of secure parameters by sending data indicative of the set of secure parameters to the first network communication device 336 and sending acknowledgement of the set of secure parameters. The data indicative of the set of secure parameters can include a request for recent DSP channel parameters of the first network communication device 336 or an identification of a current value of the rotating code. The acknowledgement of the set of secure parameters can include a message that grants the request for the sleep mode, such as an ASK message sent to the first communication device 336. The first network communication device 336 can enter the sleep mode with the stored set of secure parameters for awakening but without storage of the values of the rotating key (e.g., as rotating while the first network communication device 336 is in the sleep mode).

As illustrated by the bottom portion 337 of FIG. 3, the second network communication device 334 (e.g., node A) can wake-up the first network communication device 336. For example, the second network communication device 334 can provide a wake-up request to wake-up the first network communication device 336, and provide the value (e.g., current value) of the rotating code that is encoded using the set of secure parameters to the first network communication device 336. The first network communication device 336, responsive to the wake-up request, can provide a code synchronization request to the second network communication device 334 that prompts the second network communication device 334 to provide the value of the rotating code as encoded using the set of secure parameters. The first network communication device 336, which has the set of secure parameters stored thereon, decodes the value of the rotating code using the set of secure parameters. The secure parameters are used to mitigate or prevent tampering with the rotating code by a malicious device 338, which can be physically connected to the channel between the first and second network communication devices 334, 336.

The devices and/or systems illustrated herein can be used to implement a variety of methods. An example method, in accordance with various embodiments, includes a plurality of network devices securely communicating with one another by one or more channels conveying data in the wired communication network and using rotating codes for coding the conveyed data. The method includes entering, by a first network communication device of the plurality of network communication devices, a sleep mode at which time a value of the rotating code is unknown by the first network communication device. The first and second network communication devices authorize entering the sleep mode by communicating a variety of messages over the channel that is specific to the first and second network communication devices. The communication can include a sleep mode request from the first network communication device to the second network communication device, a set of secure parameters that is created randomly or pseudo-randomly, and an indication verifying that the first network communication device and the second network communication device agree on the set of secure parameters. The set of secure parameters are stored and used to code the value of the rotating code. The first network communication device can enter the sleep mode responsive to receiving the indication. The method further includes, responsive to the first network communication device transitioning from the sleep mode to an awake mode, synchronizing the value of the rotating code between the first network communication device and second network communication device using the set of secure parameters. For example, the first network communication device can enter the sleep mode with the stored set of secure parameters for transitioning to the awake mode but without storage of the value of the rotating key.

In specific embodiments, synchronizing the value of the rotating code can include requesting, by the second network communication device, that the first network communication device transitions to the awake mode. The method further includes requesting, by the first network communication device to the second network communication device, code synchronization in response to the request to transition, and providing, by the second network communication device, the value of the rotating code to the first network communication device that is encoded using the set of secure parameters. The first network communication device can decode the value of the rotating code using the set of secure parameters, as stored on the first network communication device.

Figure 4:
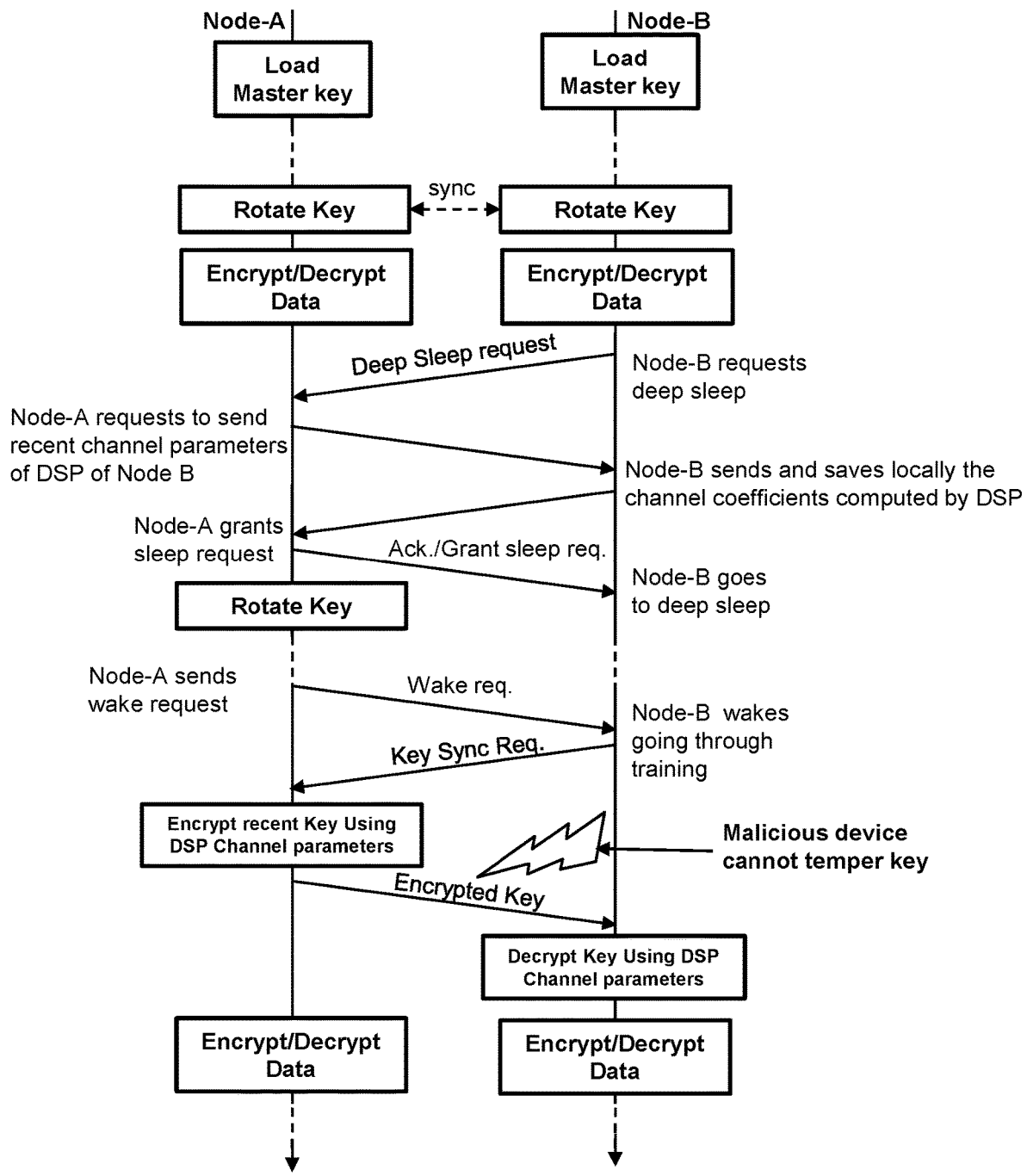
FIG. 4 is a flow chart illustrating an exemplary set of activities for network communication devices of the type implemented in a manner consistent with FIG. 1 and/or the system implemented in connection with FIGS. 2-3, in accordance with the present disclosure.
Figure 5:
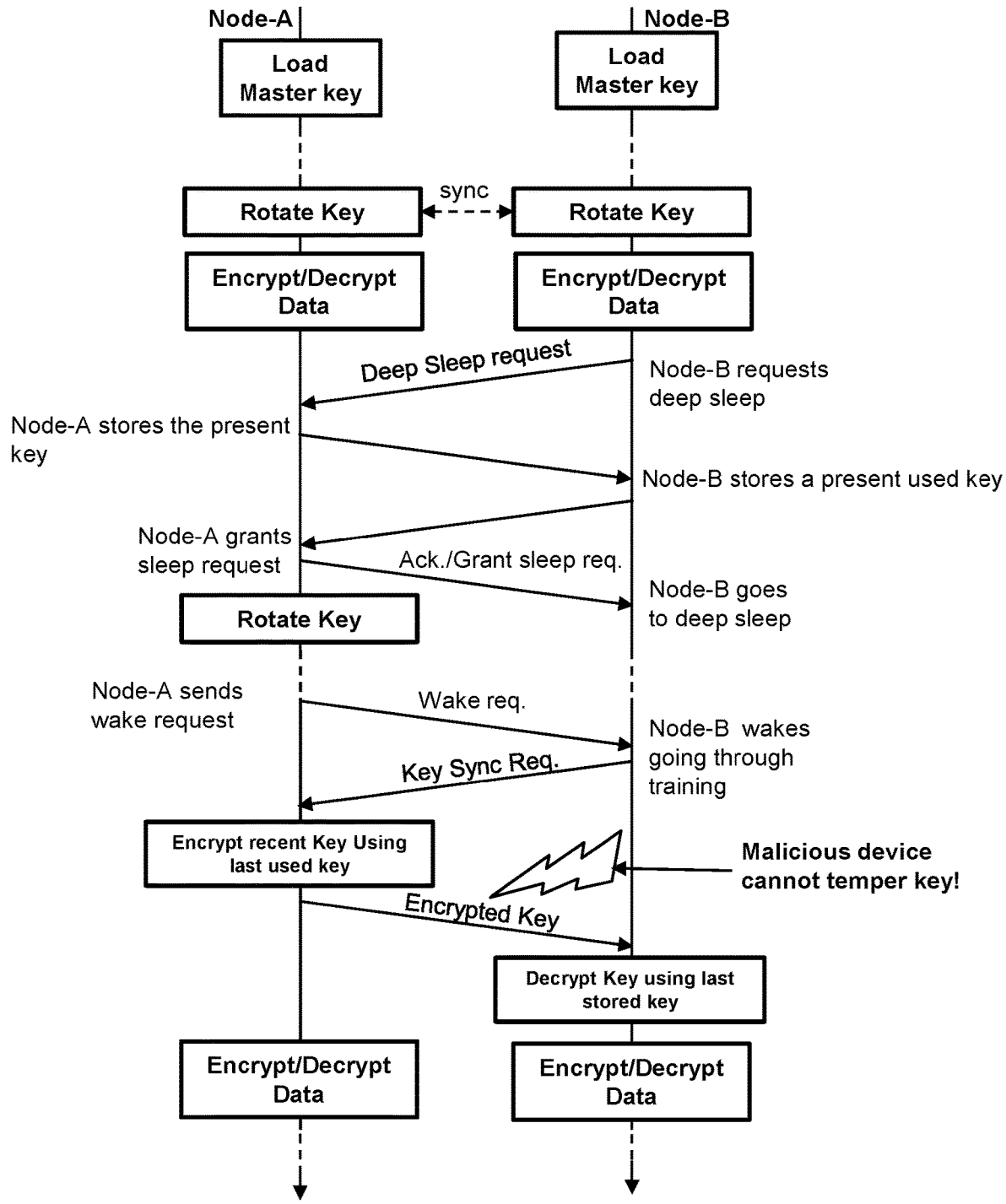
FIG. 5 is a flow chart illustrating an exemplary set of activities for network communication devices of the type implemented in a manner consistent with FIG. 1 and/or the system implemented in connection with FIGS. 2-3, in accordance with the present disclosure.

FIGS. 4-5 illustrate more specific examples of methods used to securely communicate values of rotating keys responsive to a network communication device waking up. As previously described, the set of secure parameters can include DSP channel parameters or a previous version of the rotating code. For example, in a number of embodiments, communicating the set of secure parameters that is created randomly or pseudo-randomly includes requesting, by the second network communication device, the set of secure parameters from the first network communication device, and communicating, to the second network communication device, the set of secure parameters, wherein the set of secure parameters includes channel coefficients computed by a DSP. In other embodiments, communicating the set of secure parameters that is created randomly or pseudo-created includes sending, by the second network communication device, the set of secure parameters to the first network communication device, and storing the set of secure parameters by the first network communication device and communicating acknowledgement to the second network communication device of the agreement on the set of secure parameters, wherein the set of secure parameters includes a previous value of the rotating key. The embodiments of FIGS. 4-5 illustrates examples of a secure parameter protocol in which the rotating code includes a rotating key that is encrypted and decrypted using the set of secure parameters. However, embodiments are not limited to rotating keys and/or encryption/decryption and can include a variety of codes used for encoding data for secure communications and techniques for encoding and decoding the data.

FIG. 4 is a flow chart illustrating an exemplary set of activities for network communication devices of the type implemented in a manner consistent with FIG. 1 and/or the system implemented in connection with FIGS. 2-3, in accordance with the present disclosure. More specifically, FIG. 4 illustrates an example of a set of activities used to securely communicating values of rotating keys using DSP channel parameters. As illustrated, each of the network communication devices, herein referred to as "node A" and "node B" for ease of reference, have a master key loaded. The master key can be loaded during manufacturing or other times. The master key is used to create a rotating key. Node A and node B can synchronize the value of the rotating key via a key synchronization request. The rotating key is used by node A and node B to encrypt and decrypt data communicated over a channel between node A and node B.

As illustrated by FIG. 4, node B enters a sleep mode by providing a sleep mode request to node A. Node A, in response to the sleep mode request, requests recent channel parameters of a DSP of node B, which is referred herein as "DSP channel parameters." A DSP associated with node B computes channel coefficients, which are saved by node B locally (e.g., on a data storage circuit) and provided to node A. In response, node A stores the DSP channel parameters and grants the sleep request. For example, to grant the sleep request, node A communicates, over a secure channel, an indication (e.g., ACK message) verifying that node A and node B agree on the DSP channel parameters as the set of secure parameters. Node B, in response to grant of the sleep mode, enters into the sleep mode. While node B is in the sleep mode, node A continues to rotate the value of the rotating key.

Node A can wake-up node B by providing a wake-up request to node B. Responsive to receiving the wake-up request, node B wakes up and begins going through training. For example, in response to waking up, node A and node B synchronize the value of the rotating key between the node A and node B using the set of secure parameters. More specifically, node B can provide a key synchronization request to node A. In response to the key synchronization request, node A encrypts a current value of the rotating key using the stored DSP channel parameters and provides (e.g., communicates) the encrypted key to node B. As the current value of the rotating key is encrypted, a malicious device is prevented from and/or mitigated from tampering with the rotating key. Node B decrypts the current value of the rotating key using the locally stored DSP channel parameters. Both node A and node B can subsequently use the current value of the rotating key to encrypt and decrypt data communication there between.

Although embodiments are not so limited, and in various embodiments, both node A and node B can periodically and in a synchronized manner, obtain DSP channel parameters associated with the channel. As an example, DSPs associated with the channel can be located on each end of the channel and can periodically sample the DSP channel parameters and provide the sampled DSP channel parameters to node A and node B as the set of secure parameters. In response to a wake-up request, the current value of the rotating key is coded (e.g., encrypted and decrypted) using the sampled DSP channel parameters that are obtained in a synchronized manner by node A and node B. Further, node A and/or node B can identify the malicious device is tapped to the channel in response to the sampled DSP channel parameters used to encode/decode data being different from current DSP channel parameters by a threshold amount.

FIG. 5 is a flow chart illustrating an exemplary set of activities for network communication devices of the type implemented in a manner consistent with FIG. 1 and/or the system implemented in connection with FIGS. 2-3, in accordance with the present disclosure. More specifically, FIG. 5 illustrates an example of a set of activities used to securely communicating values of rotating keys using a previous value of the rotating key. Similarly to FIG. 4, each of the network communication devices, herein referred to as "node A" and "node B" for ease of reference, have a master key loaded. The master key can be loaded during manufacturing or other times. The master key is used to create a rotating key. Node A and node B can synchronize the value of the rotating key via a key synchronization request. The rotating key is used by node A and node B to encrypt and decrypt data communicated over a secure channel between node A and node B.

Node B can enter a sleep mode by providing a sleep mode request to node A. Node A, in response to the sleep mode request, stores a previous value of the rotating key as the set of secure parameters and sends the previous value of the rotating key to Node B. In response to receiving the previous value, node B stores the previous value of the rotating key and communicates an acknowledgement to node A of agreement on the previous value of the rotating key as the set of secure parameters. In response to the acknowledgment, node A grants the sleep request. For example, to grant the sleep request, node A communicates an indication (e.g., ACK message) verifying that node A and node B agree on the previous value of the rotating key as the set of secure parameters. Node B, in response to grant of the sleep mode, enters into the sleep mode. While node B is in the sleep mode, node A continues to rotate the value of the rotating key.

Node A can wake-up node B by providing a wake-up request to node B. Responsive to receiving the wake-up request, node B wakes up and begins going through training. For example, in response to waking up, node A and node B synchronize the value of the rotating key between node A and node B using the set of secure parameters. More specifically, node B can provide a key synchronization request to node A. In response to the key synchronization request, node A encrypts a current value of the rotating key using the previous value of rotating key (e.g., which is now a past value, as the key has rotated while node B was in the sleep mode) and provides (e.g., communicates) the encrypted key to node B. As the current value of the rotating key is encrypted, a malicious device is prevented from and/or mitigated from tempering with the rotating key. Node B decrypts the current value of the rotating key using the locally stored previous value of the rotating key. Both node A and node B can subsequently use the current value of the rotating key to encrypt and decrypt data communicated there between.

Although embodiments are not so limited, and in various embodiments, both node A and node B can periodically and in a synchronized manner, store a current value of the rotating key as the set of secure parameters. In response to a wake-up request, the current value of the rotating key is encrypted and decrypted using the stored current value (now a previous vale) that is stored in a synchronized manner by node A and node B.

Although the embodiments illustrated by FIGS. 4 and 5 illustrate one cycle of entering a sleep mode and waking up, embodiments are not so limited. For example, as would be appreciated by one of ordinary skill, node B can enter a sleep mode (and subsequently wake-up) multiples times. Further, node A can enter sleep mode, with the respective activities of node A and node B switching from that illustrated by FIGS. 4 and 5. Additionally, as would be appreciated, the rotating key can be rotated multiple times, including before, after and during the node B (or node A) entering a sleep mode.

As would be appreciated by one of ordinary skill, the various communications between network communication devices, including the various requests, messages, rotating key vales, sets of secure parameters, and verification, are communicated over a channel that is specific to the respective devices communicating and associated with the wired communication network. Although some of the embodiments, e.g., FIG. 1, illustrate two network communication devices and one channel, embodiments are not so limited and can include additional devices and channels.

In various embodiments, DSP channel parameters are provided and used as a set of secure parameters. DSP channel parameters can be obtained from a point-to point network and include channel coefficients computed by a DSP of the respective network communication device. The channel is typically implemented as a physical line and can include wired cable(s), such as a twisted cable (although embodiments are not so limited). For example, the DSP can measure, filter, and/or compress signals associated with the channel to compute the DSP channels parameters (e.g., channel coefficients). The DSP channel parameters can include equalizer tap coefficients and/or echo canceller tap coefficients, among other parameters. DSP channel parameters can change with the distance/length of the channel, the temperature, aging over time, while driving (e.g., when used in automobiles), etc. The DSP of the network communication device can compute the channel coefficients, e.g., the DSP channel parameters, using an adaptive filter. As may be appreciated by one of ordinary skill, the rotating code can be generated using a key derivation function and the previous value of the code. A key derivation function can be used to derive one or more secret keys from the previous value of the code. As previously described, the first value can include a master code (e.g., master key).

Further, as may be appreciated, the wired communication network in various embodiments is not limited to wired communications, and can include a wireless communication, for example, used to extend a wired channel.

As a specific example, and for clarification, assume Media Access Control Security (MACsec) is used for key rotation. The rotating key value is rotated even when one of the network communication devices is sleeping. By agreeing on the set of secure parameters, a first network communication device can sleep and when it wakes-up, it can synchronize with the current value of the rotating key using the set of secure parameters in a way that prevents tempering by a malicious device and also allows for detection of the malicious device.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, node and/or other circuit-type depictions (e.g., reference numerals 102 and 220 of FIGS. 1 and 2) depict a circuit as described herein. Such circuits or circuitry are used together with other elements to exemplify how certain embodiments may be carried out in the form of structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 2, 4 and 5. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described and illustrated by FIGS. 4-5 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first network communication device," a "second network communication device," etc., where the network communication device might be replaced with terms such as "circuit," "circuitry" and others, the adjectives "first" and "second" are not used to connote any description of the structure or to provide any substantive meaning; rather, such adjectives are merely used for English-language antecedence to differentiate one such similarly-named structure from another similarly-named structure (e.g., "first network communication device . . . " is interpreted as "network communication device . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the activities illustrated by FIGS. 3 and 4 can be implemented using the circuitry illustrated by FIG. 1. As another example, the activities illustrated by FIGS. 3 and 4 can include additional transition between sleep mode, an awake mode, and another sleep mode, and can additional include inverse sleep mode requests. Such modifications do not depart from the true spirit and scope of various aspects of the disclosure, including aspects set forth in the claims.

What is claimed is:

1. A network communication device, comprising:
a communication circuit configured and arranged to securely communicate within a wired communication network using a rotating code; and
a processing circuit configured and arranged to enter a sleep mode, at which time, values of the rotating code are unknown by the network communication device, wherein the processing circuit enters the sleep mode by:
  requesting a second network communication device of the wired communication network to authorize entering the sleep mode; and
  entering the sleep mode responsive to an indication verifying that the network communication device and the second network communication device agree on a set of secure parameters that is created pseudo-randomly, the set of secure parameters being stored and used to code the values of the rotating code,
wherein the processing circuit enters the sleep mode with the stored set of secure parameters for awakening but without storage of the values of the rotating code.

2. The device of claim 1, further including a data storage circuit configured and arranged to store the set of secure parameters, wherein the set of secure parameters includes one or more Digital Signal Processor (DSP) channel parameters and wherein the indication is associated with a protocol used by each of the network communication device and the second network communication device.

3. The device of claim 1, further including a data storage circuit configured and arranged to store the set of secure parameters, wherein the set of secure parameters includes a previous value for the rotating code.

4. The device of claim 1, further including a data storage circuit configured and arranged to store the set of secure parameters, wherein the set of secure parameters includes a last value of the rotating code.

5. The device of claim 1, wherein the processing circuit is configured and arranged to transition from the sleep mode to an awake mode responsive to receiving a wake-up request via the communication circuit and a current value of the rotating code that is encoded using the set of secure parameters.

6. The device of claim 5, wherein the processing circuit is configured and arranged to decode the current value of the rotating code using the set of secure parameters.

7. The device of claim 5, wherein the processing circuit and the communication circuit are further configured and arranged to send a request for code synchronization to the second network communication device responsive to entering the awake mode.

8. The device of claim 1, wherein the processing circuit and the communication circuit are further configured and arranged to send a message indicative of the set of secure parameters to the second network communication device, and the network communication device further includes a data storage circuit configured and arranged to save the set of secure parameters.

9. The device of claim 1, wherein the communication circuit is configured and arranged to communicate over a channel that is specific to communications between the network communication device and second network communication device in the wired communication network, and wherein the processing circuit is configured and arranged to decode a current value of the rotating code that is encoded using the set of secure parameters after entering the sleep mode, and which mitigates detection by a connected communication device, connected to the channel, of the current value of the rotating code.

10. A system including:
each of a plurality of network communication devices including communication circuitry and processing circuitry configured and arranged to securely communicate over a channel in a wired communication network using a rotating code to encode data communicated, the plurality of network communication devices including a first network communication device configured and arranged to enter a sleep mode, at which time, a value of the rotating code is unknown to the first network communication device, by:
  requesting authorization to enter the sleep mode to a second network communication device; and
  entering the sleep mode responsive to an indication verifying that the first network communication device and second network communication device agree on a set of secure parameters created pseudo-randomly, the set of secure parameters being stored and used to code the value of the rotating code,
wherein the first network communication device enters the sleep mode with the stored set of secure parameters for awakening but without storage of the value of the rotating code.

11. The system of claim 10, wherein the plurality of network communication devices include the second network communication device configured and arranged to provide the indication verifying that the first network communication device and second network communication device agree on the set of secure parameters by sending data indicative of the set of secure parameters to the first network communication device and sending acknowledgement of the set of secure parameters.

12. The system of claim 10, wherein the plurality of network communication devices includes the second network communication device configured and arranged to:

provide a wake-up request to wake up the first network communication device; and provide the value of the rotating code that is encoded using the set of secure parameters to the first network communication device.

13. The system of claim 12, wherein the first network communication device is configured and arranged to store the set of secure parameters and send a code synchronization request to the second network communication device responsive to receiving the wake-up request from the second network communication device.

14. The system of claim 12, wherein the first network communication device is configured and arranged to decode the value of the rotating code using the set of secure parameters.

15. A method comprising:

securely communicating between a plurality of network communication devices of a wired communication network by one or more channels conveying data and using a rotating code for coding the conveyed data;

entering, by a first network communication device of the plurality of network communication devices, a sleep mode at which time a value of the rotating code is unknown by the first network communication device, wherein entering the sleep mode includes the first network communication device and a second network communication device of the plurality of network communication devices communicating:

a request for the sleep mode from the first network communication device to the second network communication device;

a set of secure parameters that is created randomly or pseudo-randomly; and an indication verifying that the first network communication device and the second network communication device agree on the set of secure parameters, the set of secure parameters being stored and used to code the value of the rotating code; and synchronizing the value of the rotating code between the first network communication device and second network communication device using the set of secure parameters responsive to the first network communication device transitioning from the sleep mode to an awake mode, wherein by the first network communication device enters the sleep mode with the stored set of secure parameters for transitioning to the awake mode but without storage of the value of the rotating code.

16. The method of claim 15, further including entering, by the first network communication device, the sleep mode responsive to receiving the indication.

17. The method of claim 15, wherein synchronizing the value of the rotating code between the first network communication device and second network communication device includes:

requesting, by the second network communication device, that the first network communication device transitions to the awake mode;

requesting, by the first network communication device to the second network communication device, code synchronization in response to the request to transition; and providing, by the second network communication device, the value of the rotating code to the first network communication device that is encoded using the set of secure parameters.

18. The method of claim 17, further including decode, by the first network communication device, the value of the rotating code using the set of secure parameters, as stored on the first network communication device.

19. The method of claim 15, wherein communicating the set of secure parameters that is created randomly or pseudo-randomly includes:

requesting, by the second network communication device, the set of secure parameters from the first network communication device; and communicating, to the second network communication device, the set of secure parameters, wherein the set of secure parameters includes channel coefficients computed by a Digital Signal Processor (DSP).

20. The method of claim 15, wherein communicating the set of secure parameters that is created randomly or pseudo-randomly includes:

sending, by the second network communication device, the set of secure parameters to the first network communication device; and storing the set of secure parameters by the first network communication device and communicating acknowledgement to the second network communication device of the verification of the set of secure parameters, wherein the set of secure parameters includes a previous value of the rotating code.

* * * * *